United States Patent
Zhang et al.

(10) Patent No.: US 10,498,919 B2
(45) Date of Patent: Dec. 3, 2019

(54) IMAGE SCANNING DEVICE, IMAGE FORMING APPARATUS WITH PRESSING MEMBER HAS POSITIONS TO CONTACT AND SEPARATE FROM DOCUMENT FOR REDUCING VERTICAL LINES IN PRINTED IMAGE

(71) Applicant: Zhuhai Seine Technology CO., Ltd., Zhuhai (CN)

(72) Inventors: Jun Zhang, Zhuhai (CN); Jianghua Yang, Zhuhai (CN); Xining Ding, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 15/913,334

(22) Filed: Mar. 6, 2018

(65) Prior Publication Data

US 2018/0270383 A1   Sep. 20, 2018

(30) Foreign Application Priority Data

Mar. 6, 2017  (CN) ...................... 2017 2 0211042 U
Apr. 25, 2017 (CN) ...................... 2017 2 0450422 U (51) Int. Cl.
*H04N 1/203* (2006.01)
*H04N 1/00* (2006.01)
(Continued)

(52) U.S. Cl.
CPC ....... *H04N 1/00994* (2013.01); *H04N 1/1061* (2013.01); *H04N 1/2034* (2013.01);
(Continued)

(58) Field of Classification Search
None
See application file for complete search history.

(56) References Cited

U.S. PATENT DOCUMENTS

6,862,115 B1 * 3/2005 Kondo ................. H04N 1/0057
                                                358/472
2006/0158701 A1 * 7/2006 Park ...................... H04N 1/121
                                                358/498
(Continued)

*Primary Examiner* — Benny Q Tieu
*Assistant Examiner* — Haris Sabah
(74) *Attorney, Agent, or Firm* — Anova Law Group, PLLC (57) ABSTRACT

An image forming apparatus includes an image scanning device, which comprises: a document tray to load an original document to be scanned; a discharge tray to load the original document after being scanned; and a frame which the document tray and the discharge tray are mounted on. A conveyance path is formed inside the frame to connect the document tray and the discharge tray. The frame contains a conveying structure to convey the original document along the conveyance path; a transparent support member located below the conveyance path to support the original document; a scanning member located below the transparent support member, the scanning member having a scanning position in which the scanning member scans the original document when being located on the transparent support member; and a pressing member disposed above the transparent support member and facing the scanning member for pressing the original document onto the transparent support member.

10 Claims, 6 Drawing Sheets (51) Int. Cl.
 *H04N 1/10* (2006.01)
 *G06K 15/02* (2006.01)
 *G06K 9/20* (2006.01)
 *G03G 15/00* (2006.01)
 *G03G 15/20* (2006.01)

(52) U.S. Cl.
 CPC ....... *G03G 15/2064* (2013.01); *G03G 15/605* (2013.01); *G03G 15/6502* (2013.01); *G03G 15/6514* (2013.01); *G06K 9/20* (2013.01); *G06K 15/021* (2013.01)

(56) References Cited

U.S. PATENT DOCUMENTS

2015/0036197 A1* 2/2015 Shingai ................ H04N 1/0057
 358/498
2015/0281499 A1* 10/2015 Hamaguchi ........ H04N 1/00572
 358/498
2016/0191738 A1* 6/2016 Nakamura ......... H04N 1/00803
 358/1.12

* cited by examiner

IMAGE SCANNING DEVICE, IMAGE FORMING APPARATUS WITH PRESSING MEMBER HAS POSITIONS TO CONTACT AND SEPARATE FROM DOCUMENT FOR REDUCING VERTICAL LINES IN PRINTED IMAGE

CROSS-REFERENCES TO RELATED APPLICATIONS

This application claims priority to Chinese Patent Application No. CN201720211042.9, filed on Mar. 6, 2017, and Chinese Patent Application No. CN201720450422.8, filed on Apr. 25, 2017, both of which are incorporated by reference in entirety.

FIELD OF THE TECHNOLOGY

The present invention relates to the field of image forming technology and, more particularly, to an image scanning device and an image forming apparatus using the image scanning device.

BACKGROUND OF THE DISCLOSURE

With current technologies, an image scanning apparatus often includes a document tray, a document discharge tray, a feeding section, an image scanning section, and an information processing section. The feeding section feeds the original document on the document tray to the image scanning section along the feeding path. After scanning the image information on the document by the image scanning section, the feeding section continues feeding the document to the document discharge tray. The scanned image information is processed by the information processing section and duplicated to a new paper after processing.

Figure 12:
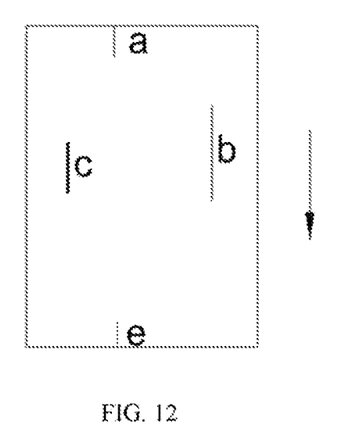
FIG. 12 illustrates a schematic diagram showing the location, length, thickness, and number of vertical black lines.

However, currently, the image formed on the new paper may have a vertical black line. As shown in FIG. 12, the direction indicated by the arrow in the figure is the paper feeding direction. During the actual operation, vertical black lines may appear on the paper, that is, the vertical black lines may appear in one or more locations of 'a', 'b', 'c', and 'e'. The figure shows only examples of the location, length, thickness, and the number of the vertical black lines. That is, the location, length, thickness and the number of the appearing vertical black lines may be random. This vertical black line is not what the user desires. Electrostatic charging of the image scanning device or of the original document may cause such problem. In the industry, the impact of static electricity on the scanning process is usually eliminated by using a static brush disposed on the feeding path and/or the frame. However, waste paper scraps or other dust may be generated during the feeding process of the original document, and the above problem may still occur if the above paper scraps or dust accumulates in the scanning position. In the industry, the paper scraps or dust is often periodically cleaned by a professional in order to solve the above problem.

Thus, such a way of using static brush cannot solve the problem of vertical black lines caused by paper scraps or dust, while the regular cleaning by professionals is costly and it is also difficult to effectively solve the vertical black line problem. Therefore, a new solution is urgently needed for the above problem.

SUMMARY

According to one aspect of the present disclosure, an image scanning device is provided. The image scanning device includes a document tray to load an original document to be scanned; a discharge tray to load the original document after being scanned; a frame which the document tray and the discharge tray are mounted on; a conveyance path is formed inside the frame to connect the document tray and the discharge tray. The frame contains a conveying structure to convey the original document along the conveyance path; a transparent support member located below the conveyance path to support the original document when passing through; a scanning member located below the transparent support member, the scanning member having a scanning position in which the scanning member scans the original document when being located on the transparent support member; and a pressing member disposed above the transparent support member and facing the scanning member for pressing the original document onto the transparent support member. The pressing member includes a pressing portion that is in contact with the original document; the pressing portion has a start position for starting to contact with the original document, an end position for starting to separate from the original document, and a middle position as a middle point between the start position and the end position; and the scanning position of the scanning member is located between the start position and the middle position in a direction perpendicular to the conveyance path.

According to another aspect of the present disclosure, an image forming apparatus is provided. The image forming apparatus includes an image scanning device for scanning an image of an original document; and an image printing device for printing the image scanned by the image scanning device. The image scanning device includes: a document tray to load the original document; a discharge tray to load the original document after being scanned; and a frame which the document tray and the discharge tray are mounted on, a conveyance path is formed inside the frame to connect the document tray and the discharge tray. The frame contains: a conveying structure to convey the original document along the conveyance path; a transparent support member located below the conveyance path to support the original document when passing through; a scanning member located below the transparent support member, the scanning member having a scanning position in which the scanning member scans the original document when being located on the transparent support member; and a pressing member disposed above the transparent support member and facing the scanning member for pressing the original document onto the transparent support member. The pressing member includes a pressing portion that is in contact with the original document; the pressing portion has a start position for starting to contact with the original document, an end position for starting to separate from the original document, and a middle position as a middle point between the start position and the end position; and the scanning position of the scanning member is located between the start position and the middle position in a direction perpendicular to the conveyance path.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present invention more clearly, the following briefly introduces the accompanying drawings used for describing the disclosed embodiments. Apparently, the accompanying drawings in the following description show merely some embodiments of the present invention, and a person of ordinary skill in the technology may derive other drawings from these accompanying drawings without creative efforts.

DETAILED DESCRIPTION

The following describes exemplary embodiments in detail, with reference to the accompanying drawings, so as to understand and implement the technical solutions to the technical problems in the present disclosure. Unless otherwise specified, a same number in different drawings may represent a same or similar element. The implementations described in the exemplary embodiments below do not represent all implementations consistent with the present disclosure. On the contrary, the implementations below are merely examples of the apparatus and the methods that are consistent with some aspects of the present disclosure, and should not be used for limiting the present disclosure. Further, as long as there is no conflict, the embodiments of the present invention and features of the embodiments may be combined with each other.

Figure 1:
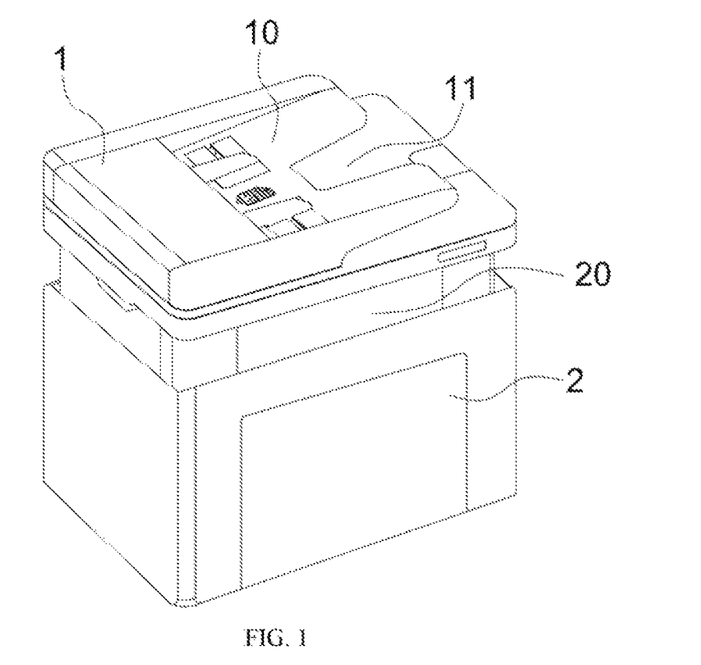
FIG. 1 illustrates a perspective view of an image forming apparatus according to an embodiment of the present invention.
Figure 2:
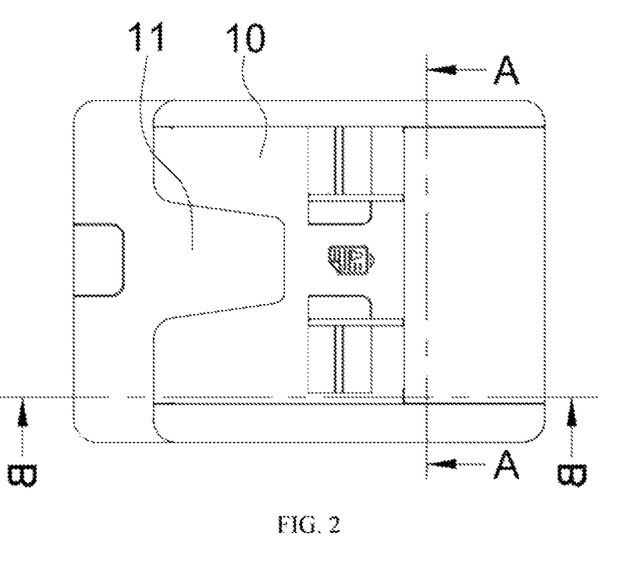
FIG. 2 illustrates a top view of an image forming apparatus according to an embodiment of the present invention.

FIG. 1 is a perspective view of an image forming apparatus according to an embodiment of the present invention. FIG. 2 is a top view of the image forming apparatus. The image forming apparatus includes an image scanning device 1 and an image printing device 2.

Referring to FIGS. 1 to 4, the image scanning device 1 includes a document tray 10, a discharge tray 11, a frame, and a conveyance path. The document tray 10 can be loaded with sheets or stacks of original documents P to be scanned, and the discharge tray 11 is used to load the original documents P discharged through the conveyance path after being scanned. The frame includes an upper frame 100 and a lower frame 101, and the document tray 10 and the discharge tray 11 are mounted on the frame. The document tray 10 is located above the discharge tray 11. The document tray 10 may be fixedly mounted on the upper frame 100 or movably mounted on the upper frame 100. The discharge tray 11 may be fixedly mounted on the lower frame 101 and also movably mounted on the lower frame 101. These mounting or connection modes are illustrative and not limiting.

Figure 3:
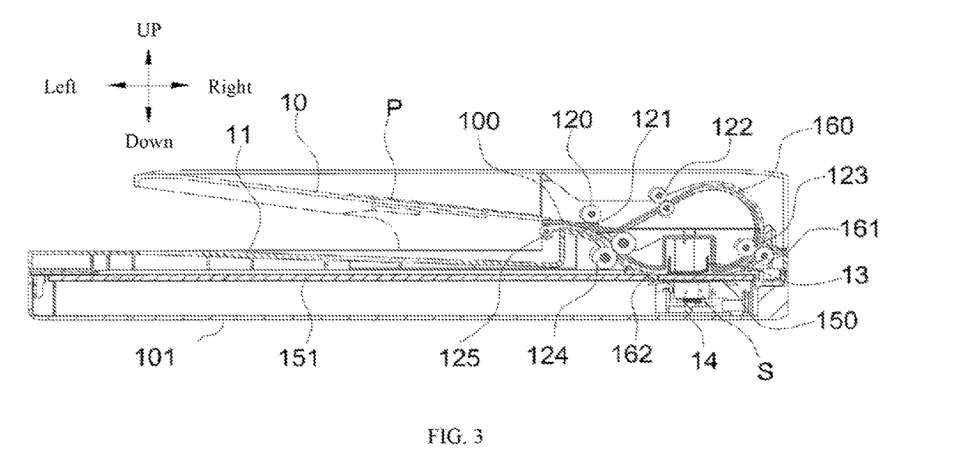
FIG. 3 illustrates a schematic cross-sectional view B-B of FIG. 2.

The conveyance path (160, 161, 162) is generally formed by the upper frame 100 and the lower frame 101 coupled together, so as to connect the document tray 10 and the discharge tray 11. The original document P is conveyed along the conveyance path including, from the upstream to the downstream, the first conveyance path 160, the second conveyance path 161, and the third conveyance path 162. The first conveyance path 160 starts at the paper feed end of the document tray 10 and ends at the conveying roller 123, and is formed substantially in an arc-like path that surrounds the pressing member 13 from the top side. The second conveyance path 161 starts at the conveying roller 123 and ends at the boundary between the transparent support member 150 and the stationary document supporting section 151. That is, most of the second conveyance path 161 is formed as a flat surface that is parallel to the horizontal surface. The third conveyance path 162 starts at the end of the second conveyance path 161 and ends at the discharge end of the discharge tray 11.

Figure 4:
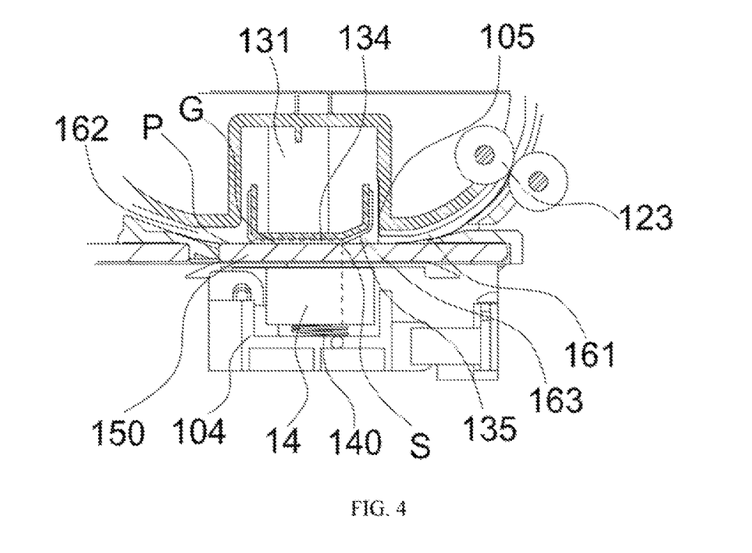
FIG. 4 illustrates a schematic sectional view of a pressing member and a scanning member according to an embodiment of the present invention.

The structure inside the frame is described in detail below with reference to FIG. 3 and FIG. 4. As shown in FIGS. 3-4, the paper-feed roller 120, the conveyance roller 122, the conveyance roller 123, and the pressing member 13 are accommodated and supported in the upper frame 100, and the transparent support member 150, the scanning member 14, the conveyance roller 124, the discharge roller 125, and the stationary document support section 151 are accommodated and supported in the lower frame 101. The paper-feed roller 120, the conveyance rollers (122, 123, 124), and the discharge roller 125 are used as specific examples of the conveyance structure for conveying the original document P along the conveyance path, that is, conveying the original document P from the document tray 10 to the discharge tray 11.

The transparent support member 150 is located below the second conveyance path 161, between the pressing member 13 and the scanning member 14, and, as a part of the second conveyance path 161, supports the original document P when passing through. Specifically, in one embodiment, the transparent support member 150 supports the original document P from below. The scanning member 14 is located below the transparent support member 150. The scanning member 14 has a scanning position S for scanning the image on the original document P. The scanning position S is a position at which the scanning member 14 scans and reads the image on the original document P.

The pressing member 13 is disposed above the transparent support member 150 and faces the scanning member 14. The pressing member 13 presses the original document P onto the transparent support member 150. The pressing member 13 includes a pressing section 134 contacting the original document P. The pressing section 134 has a start position U at which it starts to come into contact with the original document, an end position D at which it starts to separate from the original document, and a middle position M at a midpoint between the start position U and the end position D. In the direction perpendicular to the conveyance path of the original document, when the scanning position S of the scanning member 14 is located between the above-mentioned start position U and the middle position M, the probability of occurrence of vertical black lines in the scanned image can be effectively reduced, and there is no need to arrange regular cleaning by professional personnel, lowering the cost.

The automatic feeding and scanning process of the original document P will be described below with reference to FIG. 3. The original document P is loaded on the document tray 10 and, when the user inputs a scan command, the paper-feed roller 120 is rotated in the counterclockwise direction by the drive gear (not shown) and, together with the separating pad 121, moves the original documents P one by one to the conveying roller 122. Being further fed by the conveying roller 122, the original document is fed along the first conveyance path 160 to the conveyance roller 123, and the conveyance roller 123 is rotated in the clockwise direction as shown to convey the original document P between the pressing member 13 and the scanning member 14. The original document P conveyed by the conveying roller 123 reaches the upper surface of the transparent support member 150 along the second conveyance path 161.

Then, the original document P passes through the gap G between the pressing member 13 and the transparent support member 150 and, when the original document P passes through the gap G, the scanning member 14 scans the image on the original document P at the scanning position S. Then, being further conveyed by the conveying roller 123, the front end of the original document P reaches the third conveyance path 162, and then arrives at the conveying roller 124. Further, being conveyed by the conveying roller 124, the original document P reaches the discharge roller 125 and is discharged by the discharge roller 125. The discharged document P is stacked on the discharge tray 11, thereby completing the automatic conveyance of the original document P and the scanning process.

In certain embodiments, the image scanning device 1 is also provided with a stationary scanning platform. The user may place the original document P on a stationary document supporting section 151, and the scanning member 14 is provided on a support frame 104 that is movable right-and-left. Specifically, the scanning member 14 moves right and left, back and forth, below the stationary document supporting section 151 shown in FIG. 3 to complete the scanning of the stationary original document.

After the scanning of the image on the original document P is completed, the scanning member 14 transmits the scanned information to the information processing section (not shown), and may optionally cause the image printing device 2 to execute the print command. The printed sheets are stacked on the discharge tray 20. If there is static electricity on the image scanning device 1 or on the original document P, or if there is dust or the like at the scanning position S of the scanning member 14, vertical black lines as shown in FIG. 12 may appear in the printed image on the paper, and such vertical black line is not what the user wants.

Figure 9:
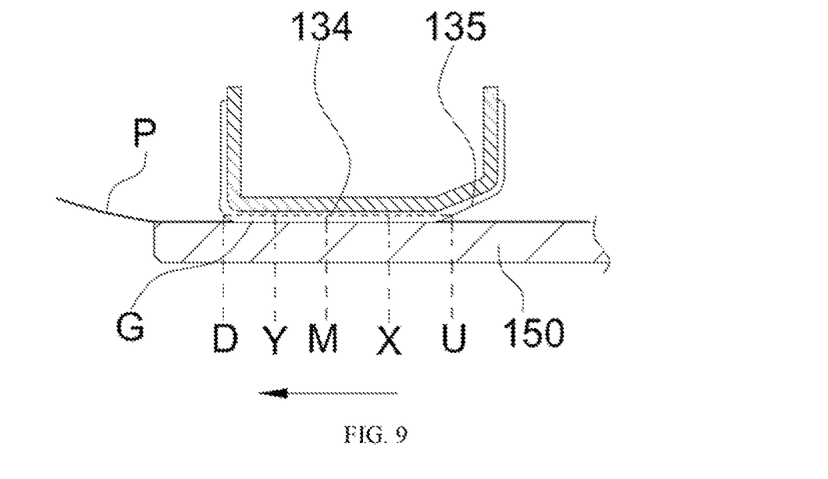
FIG. 9 illustrates a schematic view of different test positions of the pressing section according to an embodiment of the present invention.

Further, the setting of the scanning position S of the scanning member 14 will be described with reference to FIG. 9 and Table 1 below. As shown in FIG. 9, the start position U is the position at which the original document P starts to contact the pressing section 134, and the end position D is the position at which the original document P starts to leave the pressing section 134. The distance from the start position U to the end position D may be equally divided into 4 segments, dividing with the position X, the middle position M, and the position Y, from the upstream to the downstream of the conveyance path, respectively. In each segment, 25 positions may be taken for scanning and printing test. That is, in the segment UX, 25 positions are taken sequentially from the upstream to the downstream along the conveyance path, the first position of the 25 positions is the starting position U, and the 25th position is position X. In the segment XM, 25 positions are sequentially taken from the upstream to the downstream along the conveyance path, the first position of the 25 positions is the position X, and the 25th position is the middle position M. In the segment MY, 25 positions are sequentially taken from the upstream to the downstream along the conveyance path, the first position of the 25 positions is the middle position M, and the 25th position is the position Y. In the segment YD, 25 positions are sequentially taken from the upstream to the downstream along the conveyance path, the first position of the 25 positions is the position Y, and the 25th position is the terminal position D. Tests are then performed at each of the above positions, and the tests are performed on the same image forming apparatus and all other environment variables are the same. After each test, the image forming apparatus is restored to its original conditions to ensure that the initial conditions of each test are the same.

The testing procedure is as follows. In the direction perpendicular to the conveyance path, the scanning position S of the scanning member 14 is sequentially set as each of the 25 positions in the UX segment and, from the document tray 10, original documents P with the same specific image are continuously fed into the conveyance path to be scanned by the scanning position S of the scanning member 14. The number of the original documents P scanned for each position may be 500 and, correspondingly, the image printing device 2 prints on 500 blank sheets of the scanned image. The above process is repeated till the 25 positions are tested and the number of the blank sheets having any vertical black line at each position is recorded. The above process is repeated for the XM segment, the MY segment, and the YD segment, and the test data is summarized and analyzed. The number 500 is used for illustrative purposes, other numbers sufficiently large to reflect the correct probability may also be used.

TABLE I

| Segment | Number of Sheets | Number of Sheets with Vertical Black Line | Appearing Possibility |
| --- | --- | --- | --- |
| UX | 500 | 6 | 1.2% |
| XM | 500 | 14 | 2.8% |
| MY | 500 | 50 | 10% |
| YD | 500 | 62 | 12.4% |

Figure 10:
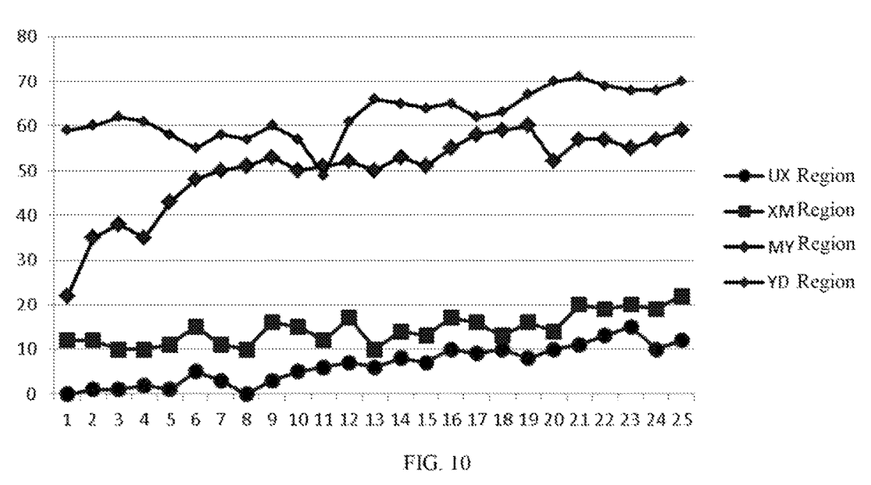
FIG. 10 illustrates a line chart of the test data provided by the embodiment of the present invention.

The test results are shown in Table 1 and FIG. 10. In Table 1, "number of sheets with vertical black line" means the average number of printed sheets with vertical black lines in each of the 25 positions in the corresponding segments. As shown in FIG. 10, the horizontal axis represents the position number in the corresponding segment, and the vertical axis represents the number of vertical black lines on the printed blank paper at the corresponding position. For example, in segment UX, the 25 positions are numbered from 1 to 25, where the position numbered 1 is the start position U and the position 25 is the position X. Within XM segment, position 1 is the position X, and position 25 is the middle position M. Same numbering also applies to the MY segment and the YD segment.

As shown in Table 1 and FIG. 10, the test results may indicate the followings.

1) In the same segment, for the test positions from upstream to downstream of the conveyance path, the probability of appearance of the vertical black line tends to increase. That is, the vertical black line is more likely to appear on the downstream side of the conveyance path than the upstream side.

2) Comparing the MY segment with the XM segment, the probability of appearance of vertical black lines suddenly increases from 2.8% of the XM segment to 10% of the MY segment, that is, the MY segment is more likely to appear vertical black lines than the XM segment.

3) The average probability of appearance of vertical black lines in the UM section is (1.2%+2.8%)/2=2.0%, and the average probability of appearance of vertical black lines in the MD section is (10%+12.4%)/2=11.2%, that is, the probability that a vertical black line appears in the UM segment is much lower than the probability that a vertical black line appears in the MD segment. In other words, a vertical black line is more likely to occur on the downstream side of the pressing section 134 than the upstream side.

4) The probability of occurrence of vertical black lines in UX segment and the XM segment is 1.2% and 2.8%, respectively. Although vertical black lines may appear, it is acceptable for users to have lower probability of occurrence of vertical black lines. The probability of occurrence of vertical black lines in the MY segment and the YD segment is high (at 10% and above) and may be unexpected to the users.

Thus, by setting the scanning position S of the scanning member 14 in the UM segment and in a direction perpendicular to the conveyance path, that is, between the start position U and the middle position M, the probability of occurrence of black vertical lines in the printed image after scanning can be effectively reduced, and there is no need for professionals to periodically clean the dust located at the scanning position S, lowering the cost.

In one embodiment, the scanning position S is provided within the UX segment and in a direction perpendicular to the conveyance path, that is, between the start position U and the position X, in which the probability of occurrence of vertical black lines may be further reduced.

In another embodiment, the scanning position S is located at the start position U and in a direction perpendicular to the conveyance path, and the probability of appearance of vertical black lines may be further reduced.

As shown in FIG. 4, the pressing member 13 includes a guide section 135, and the guide section 135 may be located on the upstream side of the pressing section 134 in the conveyance path. Further, a gap 163 is formed between the guide section 135 and the transparent support member 150, and the gap G is formed between the pressing section 134 and the transparent support member 150.

During the conveyance process of the original document P, paper scraps or dust may be generated by the rubbing between the original document P and the conveyance path, and the original document P may also carry paper scraps or dust. When the image scanning device 1 is placed in an office environment for a long time, the conveyance path may also accumulate dust. As shown in FIG. 3 and FIG. 4, the first conveyance path 160 is an arc-like or arcuate path formed by substantially surrounding the pressing member 13 from the top side. The height of the first conveyance path 160 (i.e., the dimension perpendicular to the thickness direction of the original document P) is substantially larger than the thickness of the original document P. That is, the original document P slightly warps in the conveyance path 160, and the tangential line of the first conveyance path 160 has a non-zero angle with the horizontal surface. Thus, the paper scraps or dust can automatically fall and are difficult to accumulate in the first conveyance path 160. However, if the paper scraps or dust enters the second conveyance path 161 along with the original document P and further reaches the gap G between the transparent support member 150 and the pressing member 13, because the transparent supporting member 150 is generally located parallelly to the horizontal surface, and the gap G is relatively small, the paper scraps or dust may easily accumulate in the second conveyance path 161 and/or gap G.

In certain embodiments, the scanning member 14 may be a contact image sensor (CIS) or a charge-coupled device (CCD). In order to obtain a better scanning effect, the original document P needs to be as close to the scanning member 14 as possible and, thus, the pressing member 13 may press the original document P onto the transparent support member 150 as much as possible so that the gap G between the pressing section 134 of the pressing member 13 and the transparent support member 150 is smaller than the gap 163 between the guide member 135 and the transparent support member 150. Meanwhile, the scanning member 14 is disposed on the support frame 104. A compression spring 140 is disposed between the support frame 104 and the scanning member 14 to press the scanning member 14 toward the lower surface of the transparent support member 150.

The gap G refers to the space, between the pressing section 134 and the transparent support member 150 that is perpendicular to the thickness direction of the original document P, and the gap 163 refers to the space between the guide section 135 and the transparent support member 150 that is perpendicular to the thickness direction of the original document P. In the gap G, with the accumulation of paper scraps or dust, it is possible to agglomerate spots in some places. When the scanning position S is set at the position where the paper scraps or dust is most likely to pile up, the scanned image has a high probability of appearance of the vertical black lines.

Figure 7:
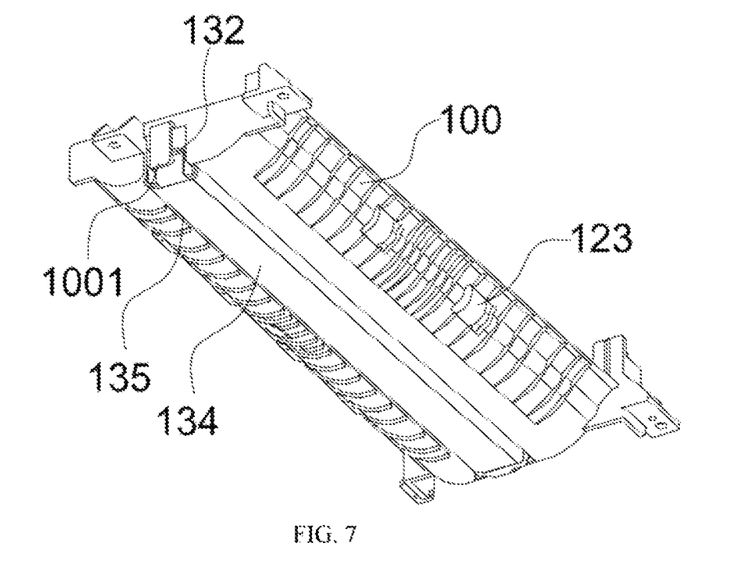
FIG. 7 illustrates a schematic diagram of the pressing member and the frame according to an embodiment of the present invention.
Figure 8:
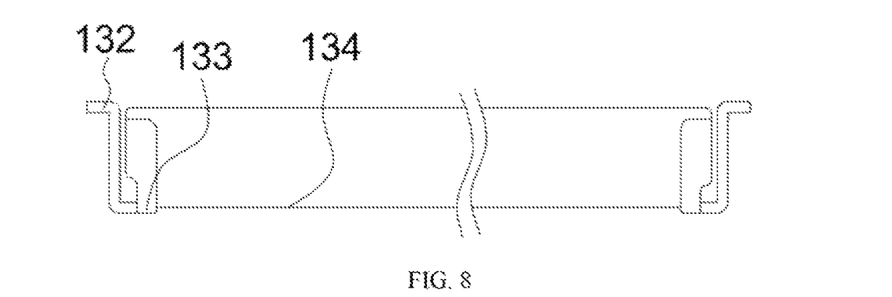
FIG. 8 illustrates a side view of the pressing member according to an embodiment of the present invention.

Referring to FIG. 7 and FIG. 8, the pressing section 134 is elongated and parallel to the transparent support member 150. The length direction of the pressing section 134 is perpendicular to the conveying direction of the original document. The length of the pressing section 134 is greater than the width of the original document P. When the original document P passes through the gap G, the pressing section 134 can apply a uniform force to the original document P and, as the length of the pressing section 134 is greater than the width of the original document P, the warpage of the original document P can be effectively prevented. The length direction of the pressing section 134 is a direction perpendicular to the direction in which the original document P is conveyed, and the width direction of the original document P refers to a direction perpendicular to the direction in which the original document P is conveyed.

Figure 5:
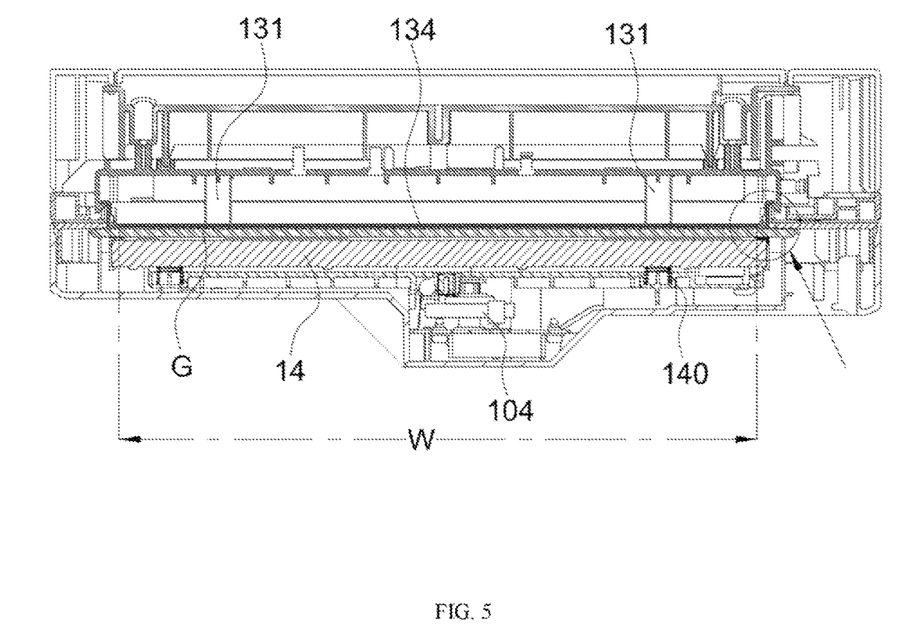
FIG. 5 illustrates a schematic cross-sectional view A-A in FIG. 2.
Figure 6:
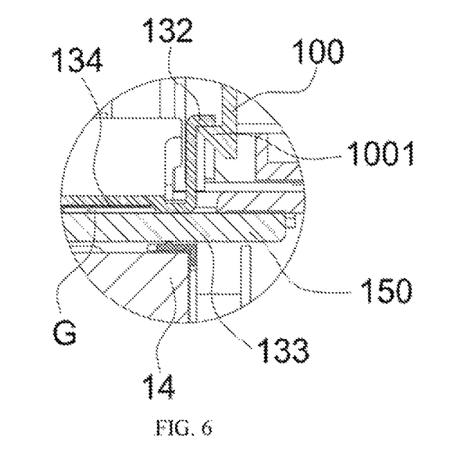
FIG. 6 illustrates a partial enlarged view of part C in FIG. 5.

As shown in FIG. 5 and FIG. 6, in certain embodiments, the two ends of the bottom surface of the pressing member 13 are provided with respective protrusions 133, protruding from the bottom surface of the pressing member 13 and contacting with the transparent support member 150, so that the gap G is formed between the pressing section 134 and the transparent support member 150. When the original document P passes through the gap G, the pressing section 134 can limit the warpage of the original document P, while not hindering the passage of the original document P.

The pressing member 13 may also include the spring 131 and the protrusion section 132. As shown in FIGS. 6, 7, and 8, a hook section 1001 is provided in the upper frame 100, the protrusion section 132 is located at two ends of the pressing member 13, and the spring 131 is located at the upper surface of the pressing member 13. The spring 131 presses the pressing member 13 to cause the pressing section 134 moving towards the transparent support member 150. The hook section 1001 cooperates with the protrusion section 132 to resist the movement of the protrusion section 132 to restrict the pressing section 134 moving towards the transparent support member 150. As the spring 131 is provided between the pressing section 134 and the upper frame 100, and an elastic force provided by the spring 131 causes the pressing section 134 moving downward, such that the gap G can be stably and reliably formed between the pressing section 134 and the transparent support member 150.

Further, an electrostatic brush 105 may be disposed in the frame. A part of the electrostatic brush 105 is located in the second conveyance path 161, and the electrostatic brush 105 is disposed near the start position U, at the upstream side from the start position U. When the original document P passes through, the electrostatic brush 105 comes into contact with the original document to eliminate the static electricity on the original document P, that is, the impact of the static electricity on the scanned image is prevented to further reduce the probability of occurrence of the vertical black lines.

Figure 11:
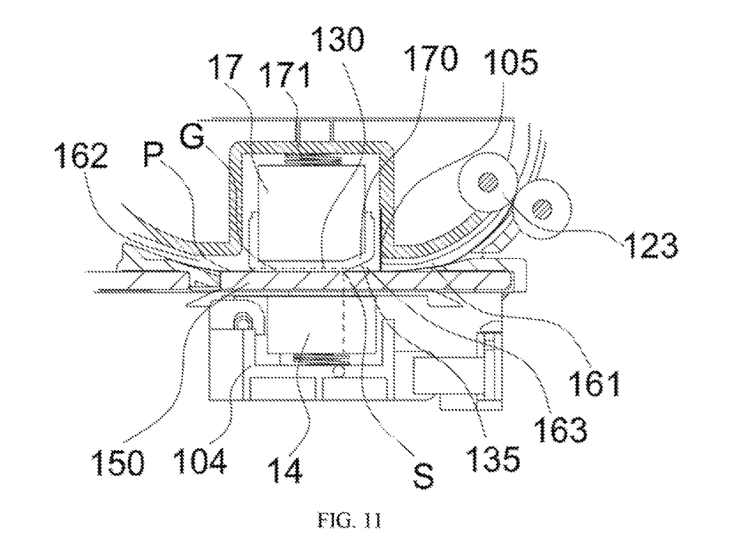
FIG. 11 illustrates a side view of a dual scanning member according to an embodiment of the present invention.

Additionally or alternatively, as shown in FIG. 11, the pressing member 13 can be replaced with a second scanning member 17, and the second scanning member 17 may be disposed above the transparent support member 150. The second scanning member 17 includes a scanning frame 170. A pressing section 130 is disposed at the bottom of the scanning frame 170. A spring 171 is disposed between the second scanning member 17 and the upper frame 100. The spring 171 provides an elastic force to cause the pressing section 130 close to the transparent support member 150. When the original document P passes between the pressing section 130 and the transparent support member 150, the second scanning member 17 scans the other surface of the original document P (one of the two surfaces of the original document is scanned by the scanning member 14). Through the scanning member 14 and the second scanning member 17, the front and back surfaces of the original document P are scanned, so as to realize the quick double-side scanning operation on the original document.

It should be noted that the above description is only some embodiments of the present invention, and is not intended to limit the present invention in any form. A person skilled in the art can make other possible variations of or simple replacements for the technical solution without departing from the invention and the technical contents, which are all within the protection scope of the technical solution of the invention.

What is claimed is:

1. An image scanning device, comprising:
    a document tray to load an original document to be scanned;
    a discharge tray to load the original document after being scanned; and
    a frame which the document tray and the discharge tray are mounted on;
    a conveyance path is formed inside the frame to connect the document tray and the discharge tray, wherein the frame contains:
    a conveying structure to convey the original document along the conveyance path;
    a transparent support member located below the conveyance path to support the original document when passing through;
    a scanning member located below the transparent support member, the scanning member having a scanning position in which the scanning member scans the original document when being located on the transparent support member; and
    a pressing member disposed above the transparent support member and facing the scanning member for pressing the original document which passing through the transparent support member from the document tray to the discharge tray,
    wherein:
    in the scanning position, a light beam irradiates from the scanning member toward lower surface of the pressing member;
    the pressing member includes a pressing section that is in contact with the original document;
    the pressing section has a start position for starting to contact with the original document, an end position for starting to separate from the original document, and a middle position as a midpoint between the start position and the end position;
    the scanning position of the scanning member is boated within a range between the start position and the middle position in a direction perpendicular to the conveyance path such that occurrence of black vertical lines in a printed image after the scanning is effectively reduced, and
    the pressing member disposed above the transparent support member and facing the scanning member for pressing the original document onto the transparent support member is an upper scanner member, a scanning position of the upper scanning member is located within a range between the start position and the middle position in the direction perpendicular to the conveyance path such that the occurrence of the black vertical lines in the printed image after the scanning is effectively reduced.

2. The image scanning device according to claim 1, wherein:
    the pressing section further includes a position X which is a midpoint between the start position and the middle position, and the scanning position of the scanning member is located between the start position and the position X in the direction perpendicular to the conveyance path.

3. The image scanning device according to claim 1, wherein:
    the pressing section has an elongated shape and is provided in parallel with the transparent support member, a length direction of the pressing section is perpendicular to a direction of conveyance path of the original document, and a length of the pressing section is greater than a width of the original document.

4. The image scanning device according to claim 3, wherein:
    two ends of a bottom surface of the pressing member are provided with two protrusions, respectively, the two protrusions protrude from the bottom surface of the pressing member and contact with the transparent support member, such that a gap is formed between the pressing section and the transparent support member.

5. The image scanning device according to claim 3, wherein the pressing member is provided with a spring for pushing the pressing section towards the transparent support member.

6. The image scanning device according to claim 5, wherein two ends of the pressing member are provided with a protrusion section, respectively, a hook section matching with the protrusion section is arranged in the frame, the hook section resists the movement of the protrusion section so as to restrict the pressing section moving towards the transparent support member.

7. The image scanning device according to claim 1, wherein the frame further contains an electrostatic brush, a part of the electrostatic brush is located in the conveyance path, and the electrostatic brush is disposed near the start position at an upstream side of the start position.

8. An image forming apparatus, comprising:
   an image scanning device for scanning an image of an original document; and
   an image printing device, for printing the image scanned by the image scanning device,
   wherein the image scanning device includes:
   a document tray to load the original document;
   a discharge tray to load the original document after being scanned; and
   a frame which the document tray and the discharge tray are mounted on;
   a conveyance path is formed inside the frame to connect the document tray and the discharge tray,
   wherein the frame contains;
   a conveying structure to convey the original document along the conveyance path;
   a transparent support member located below the conveyance path to support the original document when passing through;
   a scanning member located below the transparent support member, the scanning member having a scanning position in which the scanning member scans the original document when being located on the transparent support member; and
   a pressing member disposed above the transparent support member and facing the scanning member for pressing the original document which passing through the transparent support member from the document tray to the discharge tray,
   wherein:
   in the scanning position; a light beam irradiates from the scanning member toward lower surface of the pressing member;
   the pressing member includes a pressing portion that is in contact with the original document;
   the pressing portion has a start position for starting to contact with the original document, an end position for starting to separate from the original document;
   a middle position as a middle point between the start position and the end position; and
   the scanning position of the scanning member is boated within a range between the start position and the middle position in a direction perpendicular to the conveyance path such that occurrence of black vertical lines in a printed image after scanning is effectively reduced; and
   the pressing member disposed above the transparent support member and facing the scanning member for pressing the original document onto the transparent support member is an upper scanner member, a scanning position of the upper scanning member is boated within a range between the start position and the middle position in the direction perpendicular to the conveyance path such that the occurrence of the black vertical lines in the printed image after the scanning is effectively reduced.

9. The image forming apparatus according to claim 8, wherein:
   the pressing section further includes a position X which is a midpoint between the start position and the middle position, and the scanning position of the scanning member is located between the start position and the position X in the direction perpendicular to the conveyance path.

10. The image forming apparatus according to claim 8, wherein:
    the pressing section has an elongated shape and is provided in parallel with the transparent support member, a length direction of the pressing section is perpendicular to a direction of conveyance path of the original document, and a length of the pressing section is greater than a width of the original document.

* * * * *